US009131046B2

(12) United States Patent
Lee et al.

(10) Patent No.: US 9,131,046 B2
(45) Date of Patent: Sep. 8, 2015

(54) CUSTOM RINGBACK TONE SYSTEMS AND METHODS

(71) Applicant: RealNetworks, Inc., Seattle, WA (US)

(72) Inventors: Jun Lee, Seattle, WA (US); Steve Visintainer, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 108 days.

(21) Appl. No.: 14/079,459

(22) Filed: Nov. 13, 2013

(65) Prior Publication Data

US 2014/0066033 A1     Mar. 6, 2014

Related U.S. Application Data

(63) Continuation-in-part of application No. 13/715,919, filed on Dec. 14, 2012, now Pat. No. 8,666,375.

(60) Provisional application No. 61/570,770, filed on Dec. 14, 2011.

(51) Int. Cl.
*H04M 3/42*     (2006.01)
*H04W 4/16*     (2009.01)

(52) U.S. Cl.
CPC ............ *H04M 3/42017* (2013.01); *H04W 4/16* (2013.01)

(58) Field of Classification Search
CPC ...................... H04M 3/42017; H04M 1/72552; H04M 3/42059; H04M 3/42068; H04M 3/493; H04M 2207/18; H04W 4/16; H04W 4/02; H04L 29/08108

USPC .............. 455/414.1, 433, 567; 370/352, 356; 379/88.25, 373.01, 257; 709/245
See application file for complete search history.

(56) References Cited

U.S. PATENT DOCUMENTS

| | | | |
|---|---|---|---|
| 7,475,109 B1 * | 1/2009 | Fletcher et al. | 709/204 |
| 7,711,095 B2 * | 5/2010 | Erhart et al. | 379/88.13 |
| 8,270,933 B2 * | 9/2012 | Riemer et al. | 455/345 |
| 2004/0120494 A1 * | 6/2004 | Jiang et al. | 379/210.01 |
| 2005/0117726 A1 * | 6/2005 | DeMent et al. | 379/142.01 |
| 2006/0221941 A1 * | 10/2006 | Kishinsky et al. | 370/352 |
| 2006/0233339 A1 * | 10/2006 | Schwartz | 379/207.02 |
| 2006/0245571 A1 * | 11/2006 | Radziewicz et al. | 379/220.01 |
| 2007/0047523 A1 * | 3/2007 | Jiang | 370/352 |
| 2010/0014647 A1 * | 1/2010 | Subramaniam | 379/87 |
| 2012/0045041 A1 * | 2/2012 | Karani et al. | 379/87 |

* cited by examiner

*Primary Examiner* — Mahendra Patel
(74) *Attorney, Agent, or Firm* — AEON Law; Adam L. K. Philipp (57) ABSTRACT

A ringback tone service may be configured by determining an indication to suggest one or more callers to a user of a mobile-telephony device and obtaining historical call data describing recent calls placed by recent callers to the mobile-telephony device in a recent period of time. After identifying a number of frequent callers for whom no custom ringback tone is currently provisioned, the user is prompted to select from a list of custom ringback tones that are available to provision for incoming calls from the frequent caller(s). In some cases, the user may send a message to the caller, allowing the caller to select his or her own custom ringback tone via a user interface provided by a ringback tone-service provider.

15 Claims, 12 Drawing Sheets

CUSTOM RINGBACK TONE SYSTEMS AND METHODS

CROSS-REFERENCE TO RELATED APPLICATIONS

This application is a continuation-in-part of nonprovisional patent application Ser. No. 13/715,919; filed Dec. 14, 2012; titled CUSTOMIZABLE MEDIA AUTO-REPLY SYSTEMS AND METHODS; and naming inventors Jun LEE et al. nonprovisional patent application Ser. No. 13/715,919 claims the benefit of priority to Provisional Patent Application No. 61/570,770; filed Dec. 14, 2011; titled CUSTOMIZABLE MEDIA AUTO-REPLY SYSTEMS AND METHODS; and naming inventors Jun LEE et al. The above-cited applications are hereby incorporated by reference, in their entireties, for all purposes.

FIELD

The present disclosure relates to the field of mobile communications, and more particularly, to providing custom ringback tones to callers of mobile users.

BACKGROUND

A ringback tone (or ringing tone) is an audible indication that is heard on the telephone line by the caller while the phone they are calling is being rung. It is normally a repeated tone, designed to assure the calling party that the called party's line is ringing, although the ring-back tone may be out of sync with the ringing signal.

The ringback tone is in most cases generated in a distant switch and transmitted in-band. The distant switch also sends a message out band indicating to the rest of the following network that the phone is ringing. In most public phone networks today the ringback tone is not generated in the handset or by the local switch, as customized tones or voice announcements may be generated by the distant switch in place of a ringing signal.

Some carriers allow a subscriber to customize the ringback tone heard by some or all callers to the subscriber, such that when a caller calls the subscriber, the caller does not hear the normal repeated tone, but instead hears music, a message from the subscriber, or other recording.

DESCRIPTION

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1:
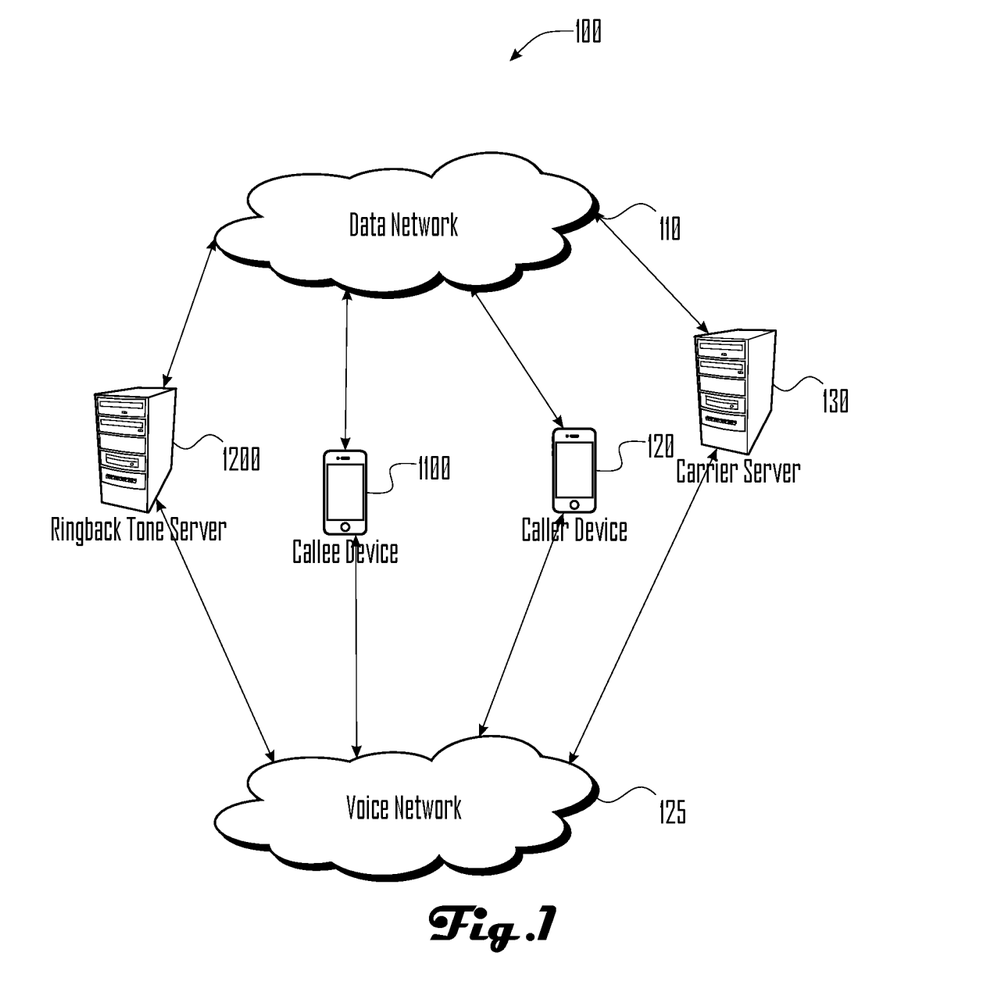
FIG. 1 illustrates a simplified ringback tone system comprising ringback tone server, callee device, caller device, and carrier server, as well as data network and voice network.

FIG. 1 illustrates a simplified ringback tone system comprising ringback tone server 1200, callee device 1100, caller device 120, and carrier server 130, as well as data network 110 and voice network 125. More specifically, in ringback tone system 100, ringback tone server 1200, callee device 1100, caller device 120, and carrier server 130 are connected to data network 110 and ringback tone server 1200, callee device 1100, caller device 120, and carrier server 130 are connected to voice network 125.

Ringback tone server 1200 (see FIG. 12, discussed below) provides ringback tone services in connection with mobile services provided by carrier server 130. In some embodiments, ringback tone server 1200 may be operated by a third-party ringback tone service. In other embodiments, some or all of the functionality described as being provided by ringback tone server 1200 may be provided by carrier server 130.

In various embodiments, data network 110 may include the Internet, a local area network ("LAN"), a wide area network ("WAN"), and/or other data network.

In various embodiments, caller device 120 and callee device 1100 may include landline telephones, mobile phones, satellite phones, tablets, laptops, desktop PCs, or other mobile-telephony devices that allow users to make and receive telephonic communications.

As used herein, the term "caller" refers to the party making a phone call or similar telephonic communication. The terms "callee" and "callee user" are used interchangeably to refer to the party being called by a caller.

In various embodiments, calls between caller device 120 and callee device 1100 are connected via voice network 125, which transmits voice communications. Voice network 125 may include a public switched telephone network ("PSTN"), a cellular network, a packet-switched network such as the Internet, and the like.

In various embodiments, voice network 125 is operated by a carrier, which is a provider of telecommunication services to its subscribers. Examples of carrier services may include Verizon Wireless, provided mainly by Verizon Communications Inc. of Basking Ridge, N.J.; AT&T Mobility, provided by AT&T Inc. of DeKalb County, Ga.; Sprint, provided by Sprint Nextel Corporation of Overland Park, Kans.; T-Mobile, provided by Deutsche Telecom AG of Bonn, Germany, and the like.

In various embodiments, carrier server 130 is operated by a carrier and connected to voice network 125. In some embodiments, carrier server 130 may comprise one or more replicated and/or distributed physical or logical devices. Carrier server 130 may also be connected to data network 110, such as the Internet.

In some embodiments, caller device 120 and callee device 1100 may be connected to data network 110 via carrier server 130. In other embodiments, caller device 120 and callee device 1100 may also be connected to data network 110 directly, for example, via a Wi-Fi connection.

For illustrative purpose, carrier server 130 includes devices that handle incoming and outgoing calls for callee device 1100. Thus, a call from caller device 120 to callee device 1100 goes through carrier server 130 and vice versa.

In various embodiments, additional infrastructure (e.g., cell sites, routers, gateways, firewalls, and the like), as well as additional devices may be present. Further, in some embodiments, the functions described as being provided by some or all of ringback tone server 1200 and carrier server 130 may be implemented via various combinations of physical and/or logical devices. However, it is not necessary to show such infrastructure and implementation details in FIG. 1 in order to describe an illustrative embodiment.

Figure 2:
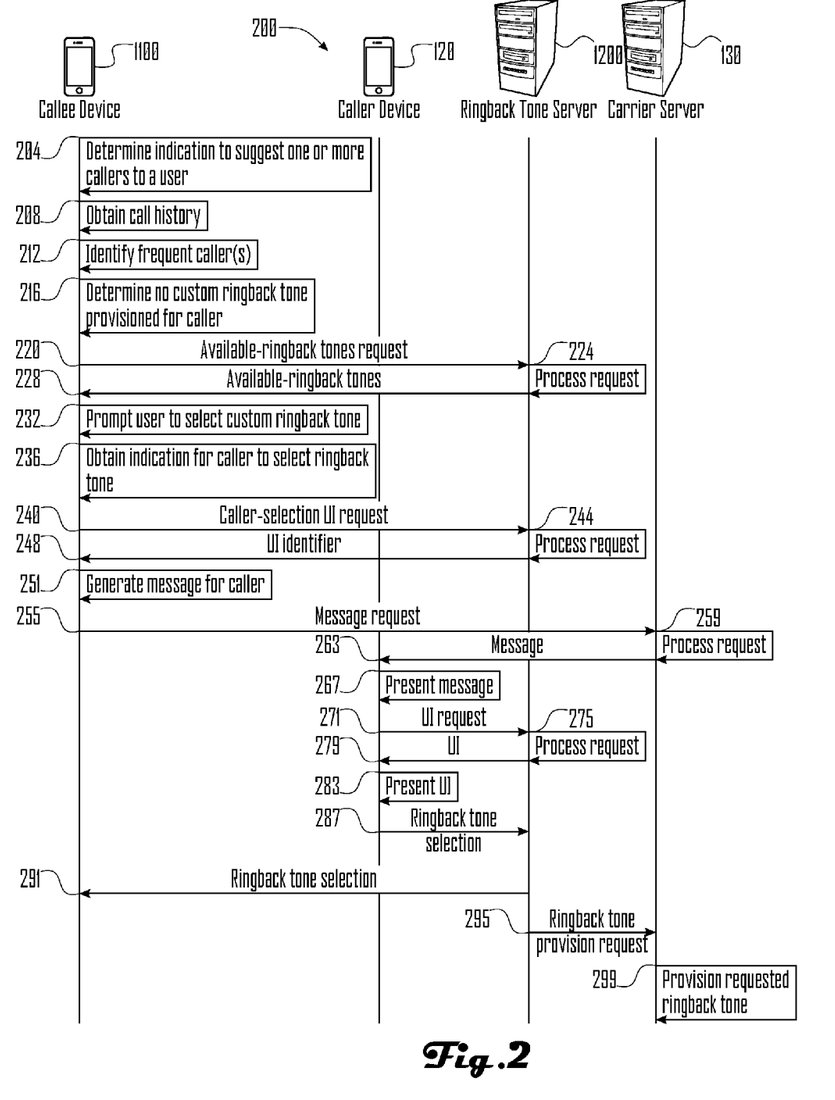
FIG. 2 illustrates an exemplary series of communications between callee device, caller device, ringback tone server, and carrier server in accordance with one embodiment.

FIG. 2 illustrates an exemplary series of communications between callee device 1100, caller device 120, ringback tone server 1200, and carrier server 130 in accordance with one embodiment. The communications shown in FIG. 2 do not encompass every combination of possibilities in which the systems and methods provided herein may be employed. Rather, the illustrated communications merely provide an overview of one simplified example scenario. Additional variations and alternatives are described more fully in the Figures and description that follow.

Beginning the illustrated sequence of communications, callee device 1100 determines 204 an indication to suggest one or more callers to a user.

Callee device 1100 obtains 208 historical call data or "call history" describing recent calls placed by recent callers to callee device 1100 in a recent-past period of time (e.g., the past few months).

Callee device 1100 identifies 212 one or more frequent callers (including caller device 120) among the recent callers.

Callee device 1100 determines 216 that no custom ringback tone is currently provisioned for caller.

Callee device 1100 sends to ringback tone server 1200 a request 220 for one or more custom ringback tones that the user of callee device 1100 has purchased or that are otherwise available for the user's use.

Ringback tone server 1200 processes 224 the request and sends to callee device 1100 one or more identifiers 228 identifying the requested custom ringback tones that the user of callee device 1100 has purchased or that are otherwise available for the user's use.

Callee device 1100 prompts 232 the user to select one of the available ringback tones as a custom ringback tone to provision as a custom ringback tone for calls placed by caller device 120 to callee device 1100.

In many cases, the user may select one of the ringback tones, but in the exemplary scenario, the user indicates 236 that the caller should select a ringback tone that he or she would like to hear when he or she places a call to callee device 1100.

Callee device 1100 sends to ringback tone server 1200 a request 240 to provide a user interface ("UI") (e.g., via the web) by which the caller can select a custom ringback tone.

Ringback tone server 1200 processes 244 the request and sends to callee device 1100 a URI, URL, or other UI identifier 248 by which the caller can access a ringback-tone-selection UI.

Callee device 1100 generates 251 a message for the caller, the message including the identifier 248 received from ringback tone server 1200.

Callee device 1100 sends to carrier server 130 a request 255 to deliver the generated message to caller device 120 and/or to notify the caller device 120 (e.g., via a push notification) that the generated message is available.

Carrier server 130 processes 259 the request and sends to caller device 120 (e.g., via a text message and/or push notification) a message prompting the caller to access the custom-ringback tone-selection UI.

Caller device 120 presents 267 the message to the caller, who indicates (not shown) a desire to access the custom-ringback tone-selection UI.

Caller device 120 sends to ringback tone server 1200 a request 271 to access the custom-ringback tone-selection UI.

Ringback tone server 1200 processes 275 the request and sends to caller device 120 data (e.g., HTML data) comprising the custom-ringback tone-selection UI.

Caller device 120 presents 283 the custom-ringback tone-selection UI to the caller, who indicates (not shown) a selection of an available ringback tone.

Caller device 120 sends to ringback tone server 1200 a ringback tone selection 287 indicating that the caller has selected one of the available ringback tones.

Ringback tone server 1200 sends to callee device 1100 an indication 291 indicating that the caller has selected a custom ringback tone.

Ringback tone server 1200 sends to carrier server 130 a request 295 to provision the selected ringback tone. In other embodiments, callee device 1100 may send request 295 to ringback tone server 1200 and/or carrier server 130.

Carrier server 130 provisions 299 the requested ringback tone such that the caller will hear the selected ringback tone for calls placed to callee device 1100.

Figure 3:
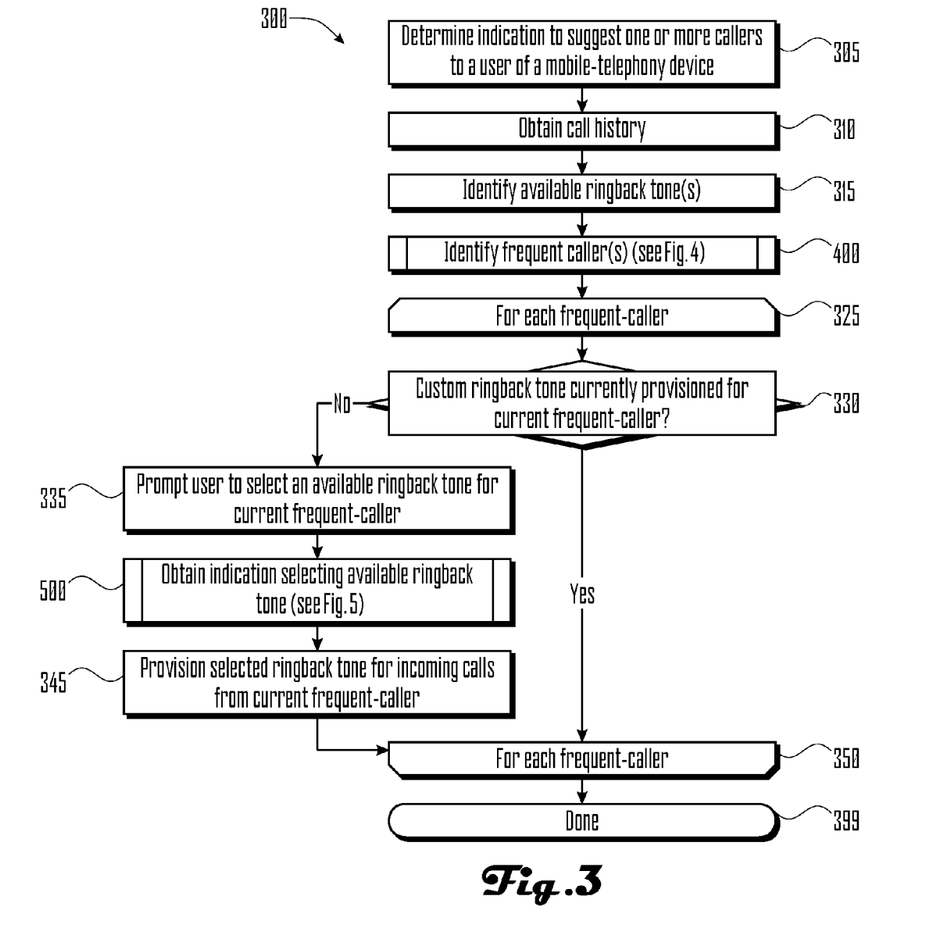
FIG. 3 illustrates a ringback-tone-configuration routine for configuring a ringback tone service, such as may be performed by a callee device in accordance with one embodiment.

FIG. 3 illustrates a ringback-tone-configuration routine 300 for configuring a ringback tone service, such as may be performed by a callee device 1100 in accordance with one embodiment.

In block 305, ringback-tone-configuration routine 300 determine an indication to suggest one or more callers to a user of a mobile-telephony device (e.g., callee device 1100).

For example, in one embodiment, ringback-tone-configuration routine 300 may execute as part of a ringback tone-service application installed on a mobile-telephony device. In some embodiments, ringback-tone-configuration routine 300 may determine such an indication as part of a setup process when the application is installed. In other embodiments, ringback-tone-configuration routine 300 may execute on a periodic basis and/or upon request from a user.

In block 310, ringback-tone-configuration routine 300 obtains a call history describing recent calls placed by recent callers to the mobile-telephony device in a recent-past period of time, such as the previous few weeks or months.

In block 315, ringback-tone-configuration routine 300 identifies one or more ringback tones that are available for use by the user of the mobile-telephony device on which ringback-tone-configuration routine 300 is executing. For example, the user may have purchased one or more ringback tones to make them available. In some embodiments, identifying available ringback tones may include querying ringback tone server 1200.

In subroutine block 400, ringback-tone-configuration routine 300 identifies, based at least in part on the call history obtained in block 310, one or more frequent callers among the recent callers identified in block 310.

Beginning in opening loop block 325, ringback-tone-configuration routine 300 processes each frequent-caller in turn.

In decision block 330, ringback-tone-configuration routine 300 determines whether a custom ringback tone is currently provisioned for the current frequent-caller. If so, then ringback-tone-configuration routine 300 proceeds to ending loop block 350. Otherwise, ringback-tone-configuration routine 300 proceeds to block 335.

In block 335, ringback-tone-configuration routine 300 prompts the user to select an available ringback tone to provision as a custom ringback tone for calls placed by the current frequent-caller to the mobile-telephony device on which ringback-tone-configuration routine 300 is executing.

In subroutine block 500, ringback-tone-configuration routine 300 obtains an indication selecting an available ringback tone.

In block 345, ringback-tone-configuration routine 300 provisions the selected ringback tone for incoming calls from the current frequent-caller.

In ending loop block 350, ringback-tone-configuration routine 300 iterates back to opening loop block 325 to process the next frequent-caller, if any.

Ringback-tone-configuration routine 300 ends in ending block 399.

Figure 4:
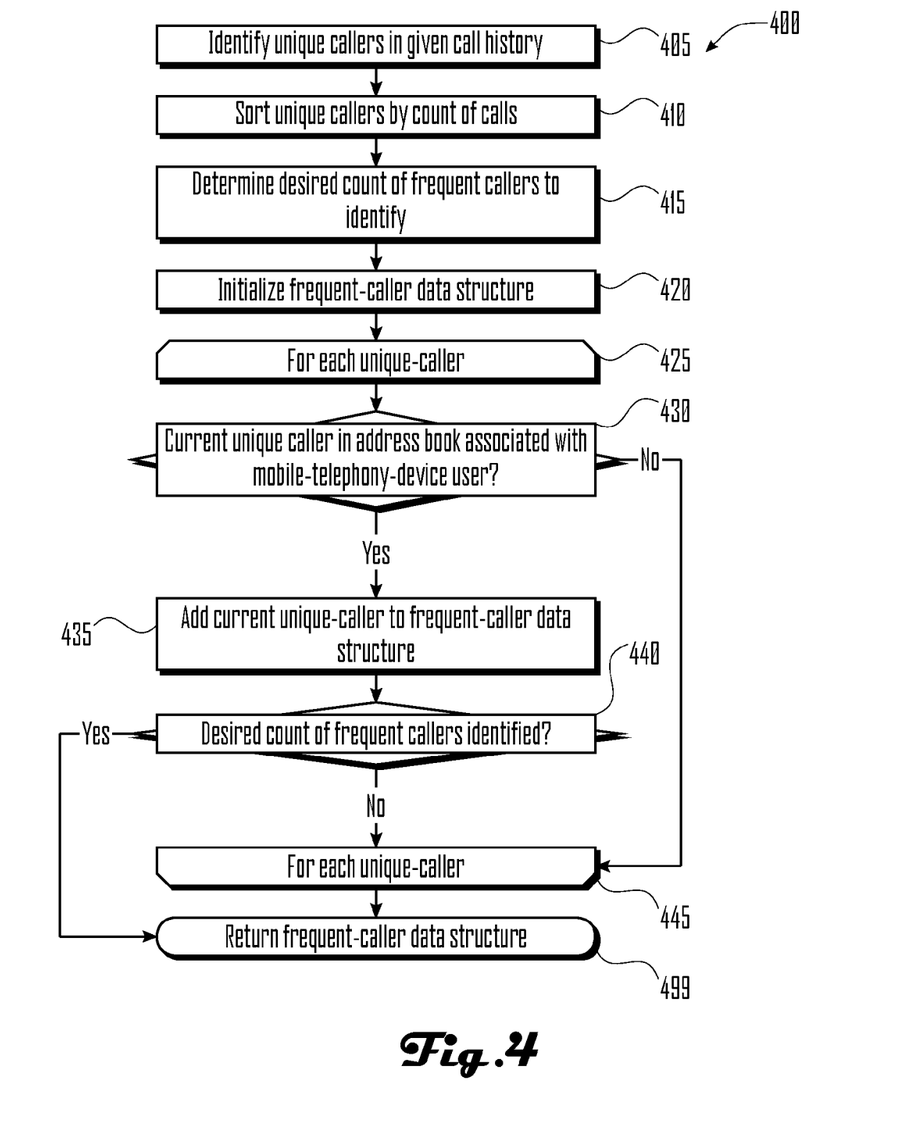
FIG. 4 illustrates a frequent-caller-identification subroutine for identifying frequent callers given a call history of a given mobile-telephony device, such as may be performed by a callee device in accordance with one embodiment.

FIG. 4 illustrates a frequent-caller-identification subroutine 400 for identifying frequent callers given a call history of a given mobile-telephony device, such as may be performed by a callee device 1100 in accordance with one embodiment.

In block 405, frequent-caller-identification subroutine 400 identifies one or more unique callers in the given call history for the given mobile-telephony device.

In block 410, frequent-caller-identification subroutine 400 sorts the unique callers identified in block 405 by a count of calls that each unique caller placed to the mobile-telephony device.

In block 415, frequent-caller-identification subroutine 400 determines a desired count of frequent callers to identify (e.g., five frequent callers).

In block 420, frequent-caller-identification subroutine 400 initializes a frequent-caller data structure (e.g., an array, list, hash, map, dictionary, or other suitable data structure).

Beginning in opening loop block 425, frequent-caller-identification subroutine 400 processes each unique caller in turn in order of descending call-count (as sorted in block 410).

In decision block 430, frequent-caller-identification subroutine 400 determines whether the current unique caller is in an address book, contact list, personal information manager, friend list, or other similar list of contacts and/or persons who are known to a user of the given mobile-telephony device. In various embodiments, such an address book (or the like) may be stored on the given mobile-telephony device; on a desktop, laptop, or similar computing device associated with the given mobile-telephony device; and/or on a remote server device accessible via a network (e.g., data network 110).

If so, frequent-caller-identification subroutine 400 proceeds to block 435. Otherwise, if the current unique caller is not in an address book (or the like) associated with the user, then frequent-caller-identification subroutine 400 proceeds to ending loop block 445.

In block 435, frequent-caller-identification subroutine 400 adds the current unique-caller to the frequent-caller data structure initialized in block 420.

In decision block 440, frequent-caller-identification subroutine 400 determines whether the desired count of frequent callers (as determined in block 415) have been identified and added to the frequent-caller data structure. If so, then frequent-caller-identification subroutine 400 proceeds to ending block 499. Otherwise, frequent-caller-identification subroutine 400 proceeds to ending loop block 445.

In ending loop block 445, frequent-caller-identification subroutine 400 iterates back to opening loop block 425 to process the next unique-caller, if any.

Frequent-caller-identification subroutine 400 ends in ending block 499, returning the frequent-caller data structure to the calling routine.

Figure 5:
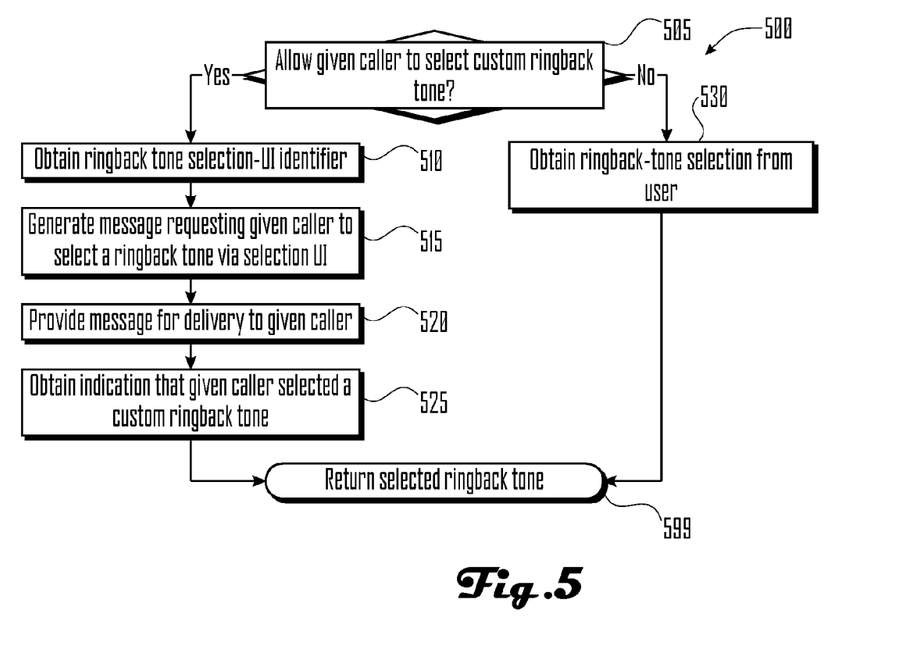
FIG. 5 illustrates a ringback-tone-selection subroutine for obtaining a selection of a ringback tone from a given list of available ringback tones for a given caller to a given mobile-telephony device, such as may be performed by a callee device in accordance with one embodiment.

FIG. 5 illustrates a ringback-tone-selection subroutine 500 for obtaining a selection of a ringback tone from a given list of available ringback tones for a given caller to a given mobile-telephony device, such as may be performed by a callee device 1100 in accordance with one embodiment.

In decision block 505, ringback-tone-selection subroutine 500 determines whether to allow the given caller to select a custom ringback tone, or to obtain a selection from a user of the given mobile-telephony device. If it is determined to allow the given caller to make the selection, then ringback-tone-selection subroutine 500 proceeds to block 510. Otherwise, ringback-tone-selection subroutine 500 proceeds to block 530.

In block 510, ringback-tone-selection subroutine 500 obtains a URI, URL, or other identifier identifying a selection UI that the given caller can access to select an available ringback tone from the given list of available ringback tones. For example, in one embodiment, ringback-tone-selection subroutine 500 may request and receive the identifier from a remote ringback tone-service server (e.g., ringback tone server 1200).

In block 515, ringback-tone-selection subroutine 500 generates a message requesting the given caller to select a ringback tone via the selection UI, the message including the selection-UI identifier obtained in block 510.

In block 520, ringback-tone-selection subroutine 500 provides the message generated in block 515 for delivery to the given caller. For example, in one embodiment, ringback-tone-selection subroutine 500 may send the generated message as a text message through a carrier server (e.g., carrier server 130). In other embodiments, ringback-tone-selection subroutine 500 may send the message or cause the message to be sent via email, a social network, or other available communications medium.

In block 525, ringback-tone-selection subroutine 500 obtains an indication that the given caller has selected a custom ringback tone via the selection UI.

In block 530, ringback-tone-selection subroutine 500 obtains a ringback-tone selection from the user of the given mobile-telephony device.

Ringback-tone-selection subroutine 500 ends in ending block 599, returning to the calling routine an identifier identifying the selected ringback tone.

Figure 6:
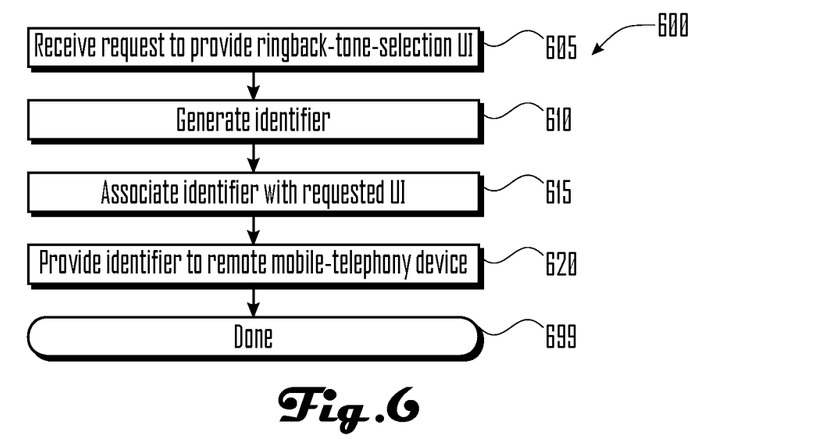
FIG. 6 illustrates a ringback-tone-UI request routine for providing an identifier identifying a user interface by which a given caller can select a custom ringback tone from ringback tones that are available to a given callee, such as may be performed by a ringback tone server in accordance with one embodiment.

FIG. 6 illustrates a ringback-tone-UI request routine 600 for providing an identifier identifying a user interface by which a given caller can select a custom ringback tone from ringback tones that are available to a given callee, such as may be performed by a ringback tone server 1200 in accordance with one embodiment.

In block 605, ringback-tone-UI request routine 600 receives a request from a remote mobile-telephony device (e.g., callee device 1100) to provide a user interface by which a caller who frequently calls the remote mobile-telephony device can select a ringback tone that the caller will hear when he or she calls the remote mobile-telephony device.

In block 610, ringback-tone-UI request routine 600 generates a unique identifier to associate with the requested user interface.

In block 615, ringback-tone-UI request routine 600 associates the identifier generated in block 610 with the requested user interface (e.g., by storing and/or updating a record in database 1240).

In block 620, ringback-tone-UI request routine 600 provides the identifier to the remote mobile-telephony device.

Ringback-tone-UI request routine 600 ends in ending block 699.

Figure 7:
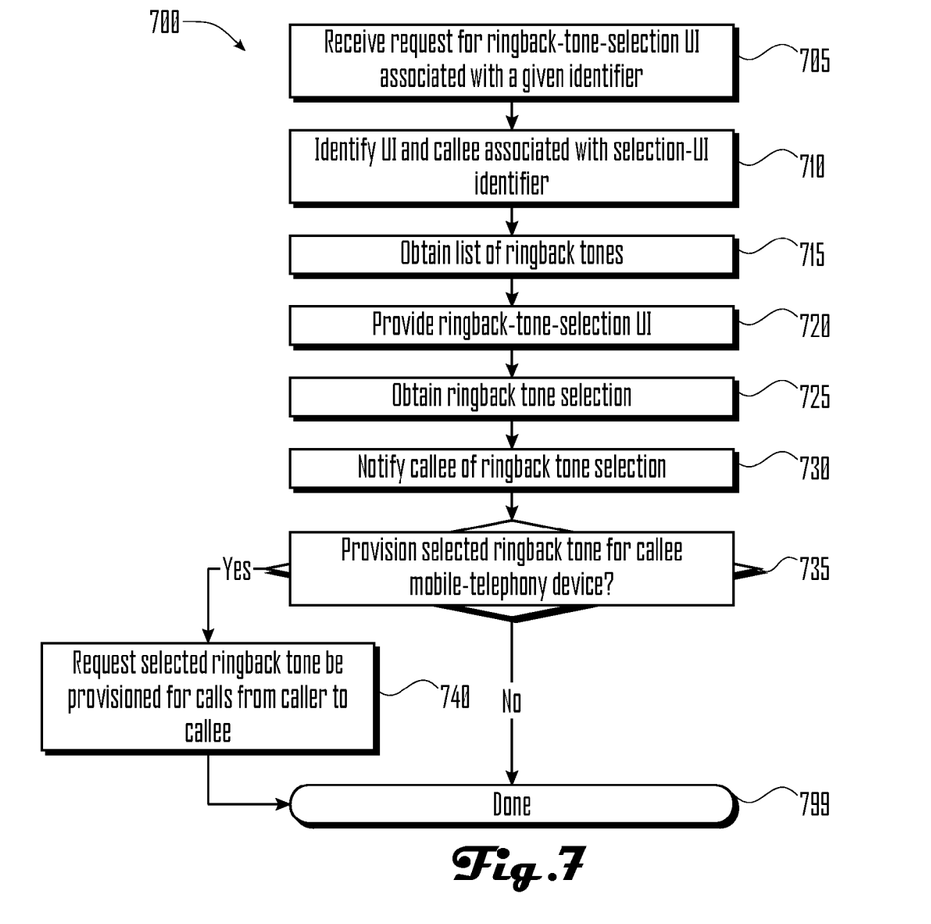
FIG. 7 illustrates a ringback-tone-UI routine for providing a user interface by which a requesting caller can select a custom ringback tone from ringback tones that are available to a given callee, such as may be performed by a ringback tone server in accordance with one embodiment.

FIG. 7 illustrates a ringback-tone-UI routine 700 for providing a user interface by which a requesting caller can select a custom ringback tone from ringback tones that are available to a given callee, such as may be performed by a ringback tone server 1200 in accordance with one embodiment.

In block 705, ringback-tone-UI routine 700 receives a request from a remote mobile-telephony device (e.g., caller device 120) including a previously-generated identifier identifying a user interface by which a caller can select a ringback tone.

In block 710, ringback-tone-UI routine 700 identifies a user-interface and a callee that were previously associated with the UI identifier received in block 705 (e.g., by using the identifier to locate a record previously stored and/or updated in database 1240).

In block 715, ringback-tone-UI routine 700 obtains a list of ringback tones to allow the caller to select from. In some embodiments, the list of ringback tones may include ringback tones that a user of the callee mobile-telephony device has purchased or that are otherwise available to that user. In other embodiments, the list of ringback tones may also include ringback tones that the user of the callee mobile-telephony device has not purchased, but that are available for the user to purchase.

In block 720, ringback-tone-UI routine 700 provides the requested ringback-tone-selection user interface to the requesting remote mobile-telephony device.

In block 725, ringback-tone-UI routine 700 obtains a ringback tone selection, via the user interface provided in block 720, of one of the list of ringback tones obtained in block 715.

In block 730, ringback-tone-UI routine 700 sends a message to the callee's remote mobile-telephony device indicating that the caller has selected a ringback tone. If the selected ringback tone requires the callee to make a purchase to make the selected ringback tone available, ringback-tone-UI routine 700 may further notify the callee that he or she can purchase the selected ringback tone.

In decision block 735, ringback-tone-UI routine 700 determines whether to provision the selected ringback tone for callee mobile-telephony device. If conditions are satisfied to provision the ringback tone (e.g., if the callee has purchased the ringback tone, and if the callee's mobile-telephony device is not responsible for provisioning the ringback tone), then ringback-tone-UI routine 700 proceeds to block 740. Otherwise, ringback-tone-UI routine 700 proceeds to ending block 799.

In block 740, ringback-tone-UI routine 700 sends a request (e.g., to carrier server 130) to provision the selected ringback tone as a custom ringback tone for calls placed by the caller to callee.

Ringback-tone-UI routine 700 ends in ending block 799.

Figure 8:
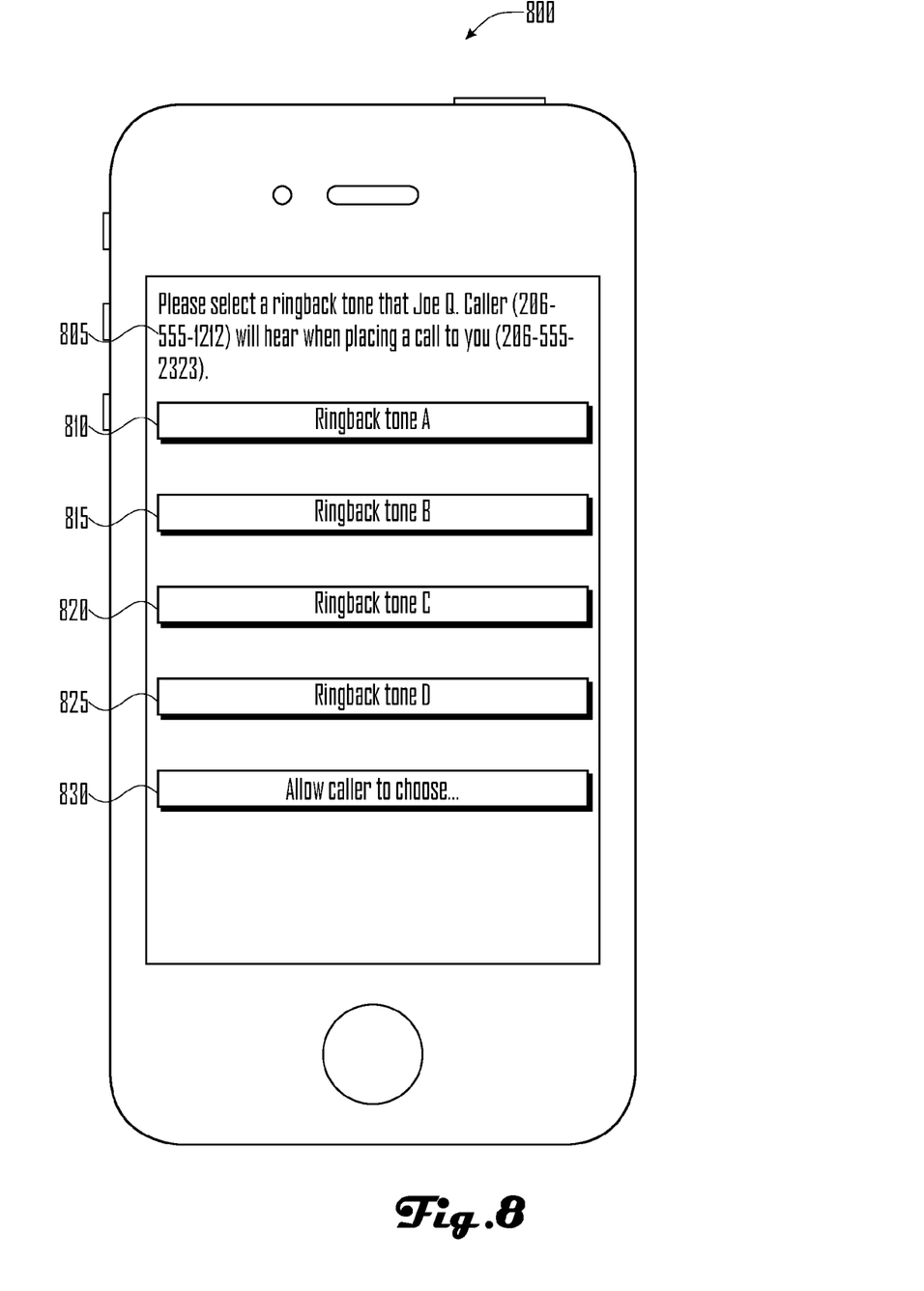
FIG. 8 illustrates an exemplary ringback-tone-selection user-interface such as may be presented to a user of a callee device, in accordance with one embodiment.

FIG. 8 illustrates an exemplary ringback-tone-selection user-interface 800 such as may be presented to a user of a callee device, in accordance with one embodiment.

Prompt 805 prompts the callee to select a ringback tone.
Control 810 allows the callee to select ringback tone A.
Control 815 allows the callee to select ringback tone B.
Control 820 allows the callee to select ringback tone C.
Control 825 allows the callee to select ringback tone D.
Control 830 allows the callee to send a message to the caller, prompting him or her to select a ringback tone using a user interface similar to exemplary ringback-tone-selection user-interface 800.

Figure 9:
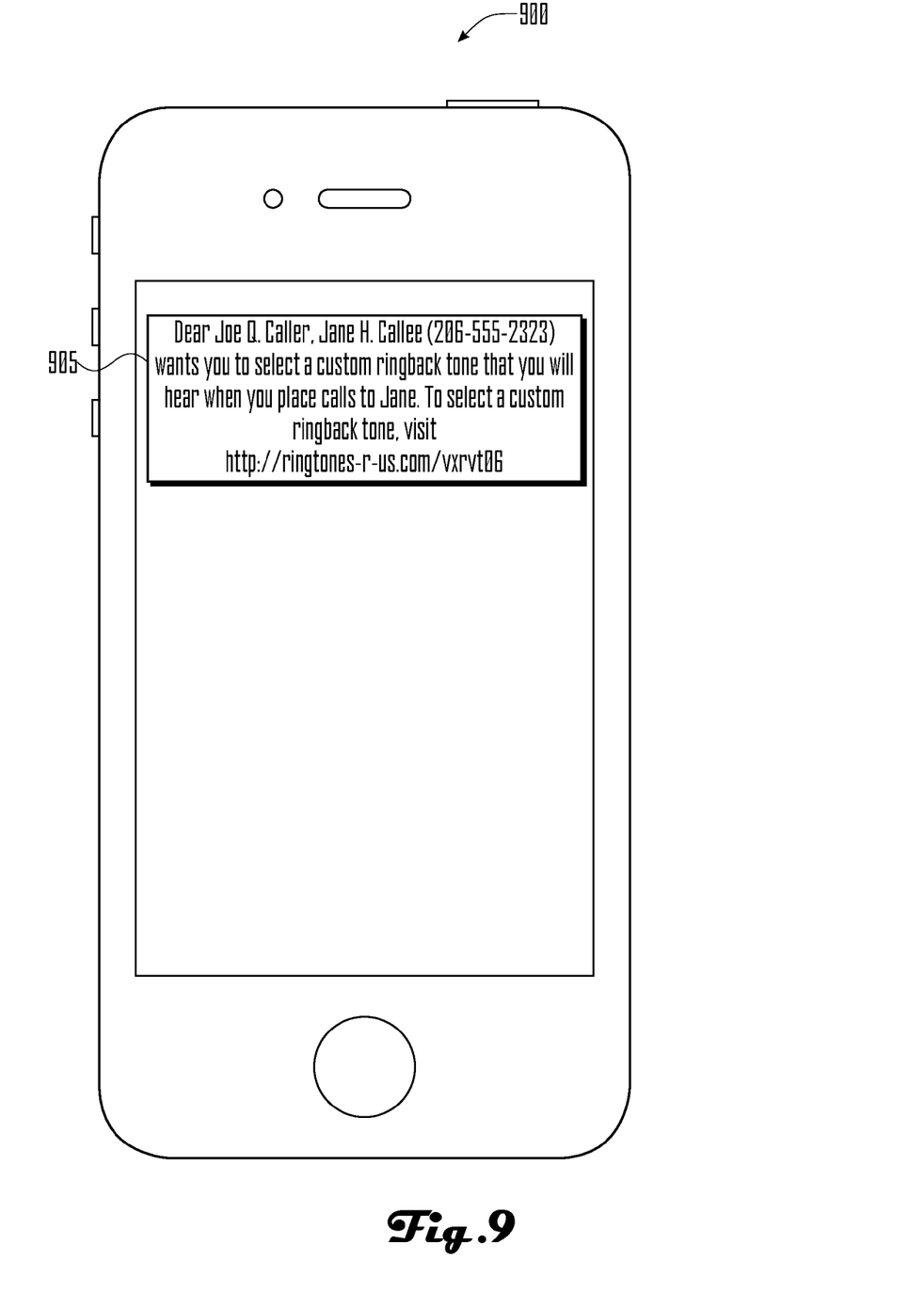
FIG. 9 illustrates an exemplary ringback-tone-selection message such as may be presented to a caller, in accordance with one embodiment.

FIG. 9 illustrates an exemplary ringback-tone-selection message 900 such as may be presented to a caller, in accordance with one embodiment.

Message 905 informs the caller that he or she may select a ringback tone by visiting a URL including an identifier ('vxrvt06') identifying a ringback-tone-selection user interface such as that shown in exemplary ringback-tone-selection user-interface 1000 (see FIG. 10, discussed below).

Figure 10:
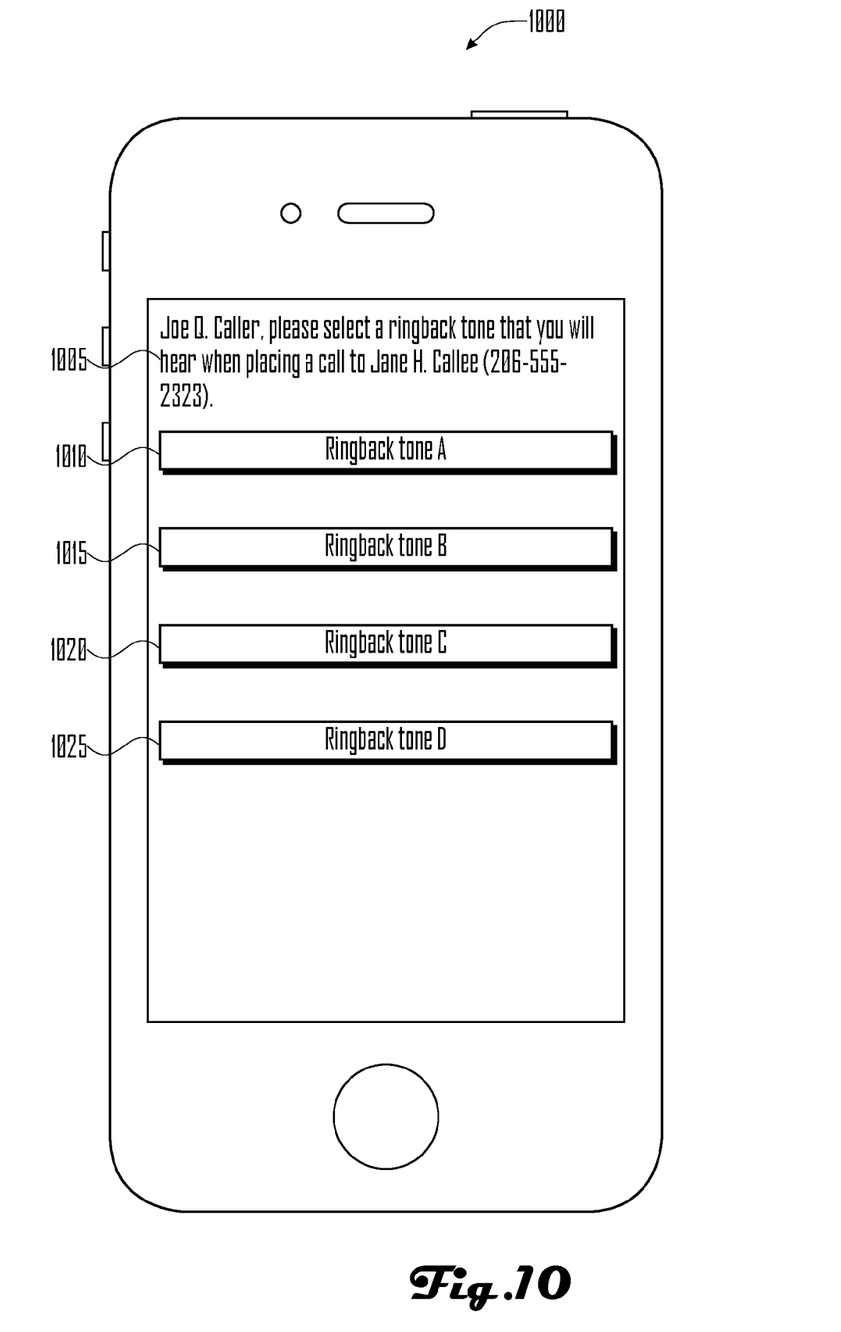
FIG. 10 illustrates an exemplary ringback-tone-selection user-interface such as may be presented to a caller, in accordance with one embodiment.

FIG. 10 illustrates an exemplary ringback-tone-selection user-interface 1000 such as may be presented to a caller, in accordance with one embodiment.

Prompt 1005 prompts the caller to select a ringback tone.
Control 1010 allows the caller to select ringback tone A.
Control 1015 allows the caller to select ringback tone B.
Control 1020 allows the caller to select ringback tone C.
Control 1025 allows the caller to select ringback tone D.

Figure 11:
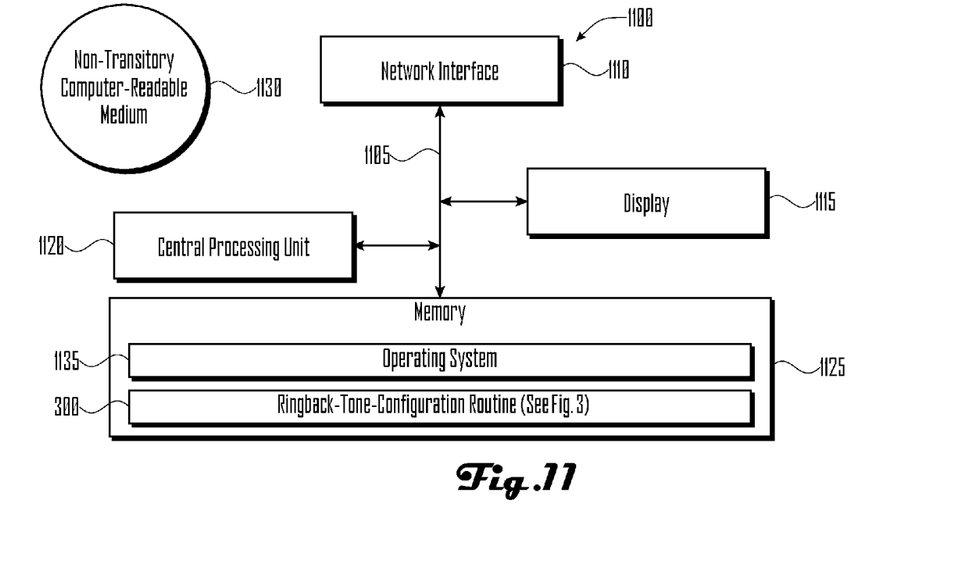
FIG. 11 illustrates several components of an exemplary callee device in accordance with one embodiment.

FIG. 11 illustrates several components of an exemplary callee device in accordance with one embodiment. In some embodiments, callee device 1100 may include many more components than those shown in FIG. 11. However, it is not necessary that all of these generally conventional components be shown in order to disclose an illustrative embodiment.

In various embodiments, callee device 1100 may include a landline telephone, mobile phone, satellite phone, tablet, laptop, desktop PC, or other mobile-telephony device that allow a user to make and receive telephonic communications.

Callee device 1100 includes a bus 1105 interconnecting several components including a network interface 1210, a display 1115, a central processing unit 1220, and a memory 1225.

Memory 1125 generally comprises a random access memory ("RAM") and a permanent non-transitory mass storage device, such as a hard disk drive or solid-state drive. The memory 1225 stores program code for a ringback-tone-configuration routine 300 for configuring a ringback tone service (see FIG. 3, discussed above). In addition, the memory 1125 also stores an operating system 1235

These and other software components may be loaded into memory 1225 of callee device 1100 using a drive mechanism (not shown) associated with a non-transitory computer-readable medium 1230, such as a floppy disc, tape, DVD/CD-ROM drive, memory card, or the like.

Figure 12:
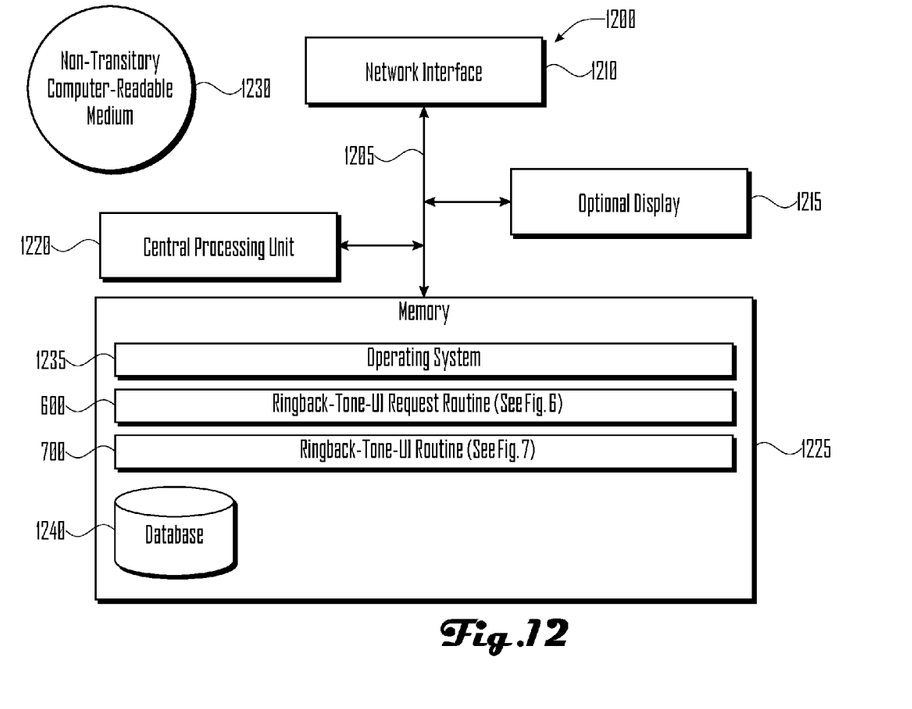
FIG. 12 illustrates several components of an exemplary ringback tone server in accordance with one embodiment.

FIG. 12 illustrates several components of an exemplary ringback tone server in accordance with one embodiment. In some embodiments, ringback tone server 1200 may include many more components than those shown in FIG. 12. However, it is not necessary that all of these generally conventional components be shown in order to disclose an illustrative embodiment.

In various embodiments, ringback tone server 1200 may comprise one or more physical and/or logical devices that collectively provide the functionalities described herein. In some embodiments, ringback tone server 1200 may comprise one or more replicated and/or distributed physical or logical devices.

In some embodiments, ringback tone server 1200 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Ringback tone server 1200 includes a bus 1205 interconnecting several components including a network interface 1210, an optional display 1215, a central processing unit 1220, and a memory 1225.

Memory 1225 generally comprises a random access memory ("RAM"), a permanent non-transitory mass storage device, such as a hard disk drive or solid-state drive. The memory 1225 stores program code for a ringback-tone-UI request routine 600 for providing an identifier identifying a user interface by which a given caller can select a custom ringback tone from ringback tones that are available to a given callee (see FIG. 6, discussed above) and a ringback-tone-UI routine 700 for providing a user interface by which a requesting caller can select a custom ringback tone from ringback tones that are available to a given callee (see FIG. 7, discussed above). In addition, the memory 1225 also stores an operating system 1235

These and other software components may be loaded into memory 1225 of ringback tone server 1200 using a drive mechanism (not shown) associated with a non-transitory computer-readable medium 1230, such as a floppy disc, tape, DVD/CD-ROM drive, memory card, or the like.

Memory 1225 also includes database 1240. In some embodiments, ringback tone server 1200 may communicate with database 1240 via network interface 1210, a storage area network ("SAN"), a high-speed serial bus, and/or via the other suitable communication technology.

In some embodiments, database 1240 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Although specific embodiments have been illustrated and described herein, it will be appreciated by those of ordinary skill in the art that alternate and/or equivalent implementations may be substituted for the specific embodiments shown and described without departing from the scope of the present disclosure. For example, in some embodiments, in addition to the caller- and callee-based selection methods described above, a user may be able to configure automatic ringback tones triggers for particular callers based on various signals, such as calendar events; geographic-tagging, location-based, and/or location-and-time-based status determinations; automatic driving-status detection (e.g., based on speed currently traveled or other signals); device-battery status (e.g., automatically setting a ringback tone informing the caller that the callee's device is out or almost out of battery power); device-service status (e.g., automatically setting a ringback tone informing the caller that the callee's device lacks a strong mobile signal, so calls may not reach the device); device-application status (e.g., automatically setting a ringback tone informing the caller that the callee can't take a call because he or she is playing the Angry Animals game); or the like. This application is intended to cover any adaptations or variations of the embodiments discussed herein.

The invention claimed is:

1. A mobile-telephony-device-implemented method for configuring a ringback tone service, the method comprising:
    determining, by said mobile-telephony device, an indication to suggest one or more callers to a user of said mobile-telephony device;
    obtaining, by said mobile-telephony device, historical call data describing a plurality of recent calls placed by a plurality of recent callers to said mobile-telephony device in a recent-past period of time;
    identifying, by said mobile-telephony device, a plurality of frequent callers among said plurality of recent callers based at least in part on said historical call data;
    selecting, by said mobile-telephony device, from among said plurality of frequent callers a caller for whom no custom ringback tone is currently provisioned for calls placed by said caller to said mobile-telephony device;
    identifying, by said mobile-telephony device, a plurality of custom ringback tones that are currently available to said user to provision for calls placed by said caller to said mobile-telephony device;
    prompting, by said mobile-telephony device, said user to select one of said plurality of custom ringback tones to provision as a custom ringback tone for calls placed by said caller to said mobile-telephony device;
    obtaining from said user an indication to allow said caller to select said custom ringback tone for calls placed by said caller to said mobile-telephony device;
    prompting said caller to select one of said plurality of custom ringback tones;
    receiving an indication that said caller selected a selected one of said plurality of custom ringback tones; and
    receiving an indication that a remote ringback-tone server caused said selected one of said plurality of custom ringback tones to be provisioned for calls placed by said caller to said mobile-telephony device.

2. The method of claim 1, further comprising:
    obtaining from said user an indication selecting a selected one of said plurality of custom ringback tones; and
    sending a request to a remote ringback-tone server to provision said selected one of said plurality of custom ringback tones for calls placed by said caller to said mobile-telephony device.

3. The method of claim 1, wherein prompting said caller comprises:
    sending a request to a remote ringback-tone server to prepare a user interface for presentation to said caller;
    obtaining from said remote ringback-tone server an identifier identifying said user interface;
    generating a message including said identifier; and sending said message from said mobile-telephony device to said caller.

4. The method of claim 3, wherein sending said message comprises sending to said caller a selected one of a text message, a push notification, and an email message.

5. The method of claim 1, wherein prompting said user comprises providing a user interface for presentation to said user.

6. The method of claim 1, further comprising:
identifying a second plurality of custom ringback tones that are not currently available to said user to provision for calls placed by said caller to said mobile-telephony device; and
prompting said user to purchase or otherwise obtain one of said second plurality of custom ringback tones.

7. The method of claim 1, wherein determining an indication comprises determining that a ringback-tone application was recently installed on said mobile-telephony device.

8. A computing apparatus for configuring a ringback tone service, the apparatus comprising a processor and a memory storing instructions that, when executed by the processor, configure the apparatus to:
determine an indication to suggest one or more callers to a user of the computing apparatus;
obtain historical call data describing a plurality of recent calls placed by a plurality of recent callers to the computing apparatus in a recent-past period of time;
identify a plurality of frequent callers among said plurality of recent callers based at least in part on said historical call data;
select from among said plurality of frequent callers a caller for whom no custom ringback tone is currently provisioned for calls placed by said caller to the computing apparatus;
identify a plurality of custom ringback tones that are currently available to said user to provision for calls placed by said caller to the computing apparatus;
prompt said user to select one of said plurality of custom ringback tones to provision as a custom ringback tone for calls placed by said caller to the computing apparatus;
obtain from said user an indication to allow said caller to select said custom ringback tone for calls placed by said caller to the computing apparatus;
prompt said caller to select one of said plurality of custom ringback tones;
receive an indication that said caller selected a selected one of said plurality of custom ringback tones; and
receive an indication that a remote ringback-tone server caused said selected one of said plurality of custom ringback tones to be provisioned for calls placed by said caller to the computing apparatus.

9. The apparatus of claim 8, wherein the memory stores further instructions that further configure the apparatus to:
obtain from said user an indication selecting a selected one of said plurality of custom ringback tones; and
send a request to a remote ringback-tone server to provision said selected one of said plurality of custom ringback tones for calls placed by said caller to the computing apparatus.

10. The apparatus of claim 8, wherein the instructions that configure the apparatus to prompt said caller further comprise instructions configuring the apparatus to:
send a request to a remote ringback-tone server to prepare a user interface for presentation to said caller;
obtain from said remote ringback-tone server an identifier identifying said user interface;
generate a message including said identifier; and
send said message from the computing apparatus to said caller.

11. The apparatus of claim 10, wherein the instructions that configure the apparatus to send said message further comprise instructions configuring the apparatus to send to said caller a selected one of a text message, a push notification, and an email message.

12. A non-transitory computer-readable storage medium having stored thereon instructions that, when executed by a processor, configure the processor to:
determine an indication to suggest one or more callers to a user of the processor;
obtain historical call data describing a plurality of recent calls placed by a plurality of recent callers to the processor in a recent-past period of time;
identify a plurality of frequent callers among said plurality of recent callers based at least in part on said historical call data;
select from among said plurality of frequent callers a caller for whom no custom ringback tone is currently provisioned for calls placed by said caller to the processor;
identify a plurality of custom ringback tones that are currently available to said user to provision for calls placed by said caller to the processor;
prompt said user to select one of said plurality of custom ringback tones to provision as a custom ringback tone for calls placed by said caller to the processor;
obtain from said user an indication to allow said caller to select said custom ringback tone for calls placed by said caller to the processor;
prompt said caller to select one of said plurality of custom ringback tones;
receive an indication that said caller selected a selected one of said plurality of custom ringback tones; and
receive an indication that a remote ringback-tone server caused said selected one of said plurality of custom ringback tones to be provisioned for calls placed by said caller to the processor.

13. The non-transitory computer-readable storage medium of claim 12, having stored thereon further instructions that further configure the processor to:
obtain from said user an indication selecting a selected one of said plurality of custom ringback tones; and
send a request to a remote ringback-tone server to provision said selected one of said plurality of custom ringback tones for calls placed by said caller to the processor.

14. The non-transitory computer-readable storage medium of claim 12, wherein the instructions that configure the processor to prompt said caller further comprise instructions configuring the processor to:
send a request to a remote ringback-tone server to prepare a user interface for presentation to said caller;
obtain from said remote ringback-tone server an identifier identifying said user interface;
generate a message including said identifier; and
send said message from the processor to said caller.

15. The non-transitory computer-readable storage medium of claim 14, wherein the instructions that configure the processor to send said message further comprise instructions configuring the processor to send to said caller a selected one of a text message, a push notification, and an email message.

* * * * *